United States Patent [19]
Chapin

[11] Patent Number: 4,626,130
[45] Date of Patent: Dec. 2, 1986

[54] DRIP IRRIGATION SYSTEM

[76] Inventor: Richard D. Chapin, 368 N. Colorado Ave., Watertown, N.Y. 13601

[21] Appl. No.: 727,622

[22] Filed: Apr. 30, 1985

Related U.S. Application Data

[63] Continuation of Ser. No. 559,853, Dec. 12, 1983, abandoned, which is a continuation of Ser. No. 261,699, May 8, 1981, abandoned.

[51] Int. Cl.$^4$ .................. B05B 15/00; E02B 13/00
[52] U.S. Cl. ........................................ 405/44; 405/43; 239/542; 239/547
[58] Field of Search ............... 405/36, 37, 43-45; 138/111-114; 239/542, 547, 145

[56] References Cited

U.S. PATENT DOCUMENTS

| | | | |
|---|---|---|---|
| Re. 28,095 | 7/1974 | Chapin | 405/44 |
| 2,798,768 | 7/1957 | Babin | |
| 3,361,359 | 1/1968 | Chapin | |
| 3,426,544 | 2/1969 | Curtis | 405/44 |
| 3,467,142 | 9/1969 | Boyle et al. | |
| 3,672,571 | 6/1972 | Goodricke | |
| 3,777,987 | 12/1973 | Allport | |
| 3,866,833 | 2/1975 | Shibata et al. | |
| 3,874,598 | 4/1975 | Havens | |
| 3,903,929 | 9/1975 | Mock | 405/43 X |
| 4,173,309 | 11/1979 | Drori | |
| 4,195,784 | 4/1980 | Gilead | |
| 4,196,853 | 4/1980 | Delmer | |
| 4,199,106 | 4/1980 | Kojimoto et al. | |
| 4,235,380 | 11/1980 | Delmer | |
| 4,247,051 | 1/1981 | Allport | 239/542 |

Primary Examiner—Cornelius J. Husar
Assistant Examiner—Nancy J. Stodola
Attorney, Agent, or Firm—Fleit, Jacobson, Cohn & Price

[57] ABSTRACT

An elongated water distributing hose capable of effectively watering large areas with readily available water pressures and in a matter whereby an essential uniform watering is achieved. This desired uniform watering results notwithstanding sloping ground conditions and the like. The pressure is substantially maintained throughout the length of the hose though a particular arrangement of first, second, and third fluid passages, which enable a maintaining of the relatively high pressure throughout the length of the hose and the reduction of this pressure directly at the point of the passing of the water from the high pressure first fluid passage through a series of first fluid-passing openings to the much smaller second fluid passage, and a further pressure reduction as the water passes within the third fluid passage between a series of second fluid-passing openings and a series of discharge fluid-passing openings. In this way, the hydraulic principle of flow of fluids passing through an orifice is combined with the hydraulic principle of flow of fluids moving through a slender tubular member made into one continuous hose.

42 Claims, 8 Drawing Figures

DRIP IRRIGATION SYSTEM

This application is a continuation of application Ser. No. 559,853, filed Dec. 12, 1983, now abandoned, which is a continuation of application Ser. No. 261,699, filed May 8, 1981, now abandoned.

BACKGROUND OF THE INVENTION

1. Field of the Invention

This invention relates to a water distributing hose for use in a trickle irrigation or drip irrigation system.

2. Background of the Prior Art

The present invention relates to irrigation systems particularly adapted for the surface or subsurface watering of long runs of crops, whether on greenhouse benches or in the field, and more specifically relates to a trickle irrigation system wherein the water is allowed to discharge slowly, directly at the desired point of application, normally about the base of the plants.

It has long been recoqnized that an efficient means is needed for applying water to crops, particularly fied crops, at or below surface leve. Since at least as early as 1911 attempts have been made to solve the problems associated with the efficient distribution of water at or below soil level in view of, among other advantages, the substantial saving in water which can be achieved as compared to the conventional overhead sprinkling systems. Recent innovations have been directed to the concept of trickle irrigation. As an example, in row crops, it is only necessary to irrigate the rows and not the entire field. Such a limiting of the watering to the rows by trickle irrigation can effect a water saving of approximately 40 to 50 percent. As the need for food for the world's expanding population increases and water shortages become more acute, such savings will become increasingly more important. In this connection, trickle irrigation is especially significant because it delivers water at or below the surface and provides for a siqnificant conservation of water.

Since there is considerably less water used in trickle irrigation, it is important that the water be directed precisely to the plant's root area. The flow from some known prior art hoses comes out in a tiny squirt, which can be blown by the wind so that sometimes it does not uniformly wet the area next to the plant row. When an irrigation hose is located on top of the soil it is often twisted slightly by the contour of the soil. This causes the squirt to come out at different angles. The water from some of the squirts could fall next to the plant row and other squirts would be directed between the rows of plants leaving some root areas dry.

When the irrigation hose is used under a plastic mulch, as is frequently done, the flow sometimes squirts against the underside of the plastic mulch which deflects the water and causes part of it to follow the underside of the plastic and run off into the isle between the plant rows. The squirt sometimes has enough force to cause a tiny washout on elevated beds so that water runs down the side of the bed into the isle rather than remaining on top of the bed surface and uniformly penetrating the entire bed.

To be practical, trickle irrigation must provide for the delivery of water at a slow uniform rate over long lengths or runs of hose. In the past, various trickle irrigation systems have been tried, including pipes with small holes, pipes with various types of small outlet members, pipes with small tubes for outlets, plastic pipes with slits, tubes which ooze water through the wall, and hoses which ooze water through a sewn seam. Each type has depended on a small orifice, low pressure, friction created in a long outlet member such as a tube, or a combination of these to limit the flow through each individual outlet. However, there are disadvantages associated with each such known system. For example, the use of extremely small orifices such as holes, slits, or the like, tend to clog easily. Tube outlets and special outlet members are relatively expensive to produce and ship, particularly when considering the large quantities required. In addition, low pressure systems and tubes which provide for an oozing of the water through the wall are not capable of producing a uniform flow along the length of the hose or the like, particularly on sloping runs.

Since drip irrigation hoses are commonly made with wall thicknesses ranging from 0.003" to 0.030", the hoses are sometimes subject to damage from ants. When this occurs, ants have been known to go through the main wall of the hose, but usually they will chew around the edges of existing discharge openings, enlarging them, sometimes to several times their original diameter. In previous double chamber hoses, this causes the hose to have a heavy water flow at the enlarged discharge opening and a much lower flow in other nearby openings, resulting in a non-uniform irrigation.

One water distributing hose which has met with success is that disclosed in U.S. Pat. No. Re. 28,095, reissued July 30, 1974 to Chapin. In the reissue patent, a water distributing hose is shown in the context of a trickle irrigation system. The hose shown in FIG. 3 basically comprises an outer tubular wall and an inner wall spaced interiorly from the outer wall defining an inner tubular member. Both walls are perforated with the outer wall having a greater number of openings. The inner tube functions so as to carry water along the full length of the hose and maintain, to a substantial degree, the uniform pressure thereof. The water discharges through the inner wall openings and subsequently flows to and through the outer wall openings for a trickle discharge therefrom. Although the performance of this hose has been excellent, there is, nevertheless, always a need for improved performance. The present invention is directed toward filling that need while at the same time minimizing the disadvantages described above in connection with known systems.

SUMMARY OF THE INVENTION

The present invention relates to an elongated fluid distributing hose for use in an irrigation system for plants, vegetables, and the like. The hose of the present invention enables the construction of a drip irrigation system which is extremely inexpensive while at the same time capable of effectively watering large areas with readily available water pressures and in a matter whereby an essential uniform watering is achieved. This desired uniform watering results notwithstanding sloping ground conditions and the like. The pressure is substantially maintained throughout the length of the tube without requiring the use of extremely small orifices such as easily clog from impurities, reliance instead being had on a particular arrangement of first, second, and third fluid passages which enable a maintaining of the relatively high pressure throughout the length of the hose and the reduction of this pressure directly at the point of the passing of the water from the high pressure first fluid passage through a series of first fluid-passing openings to the much smaller second fluid passage, and a further pressure reduction as the water passes within the third fluid passage between a series of second fluid-passing openings and a series of discharge fluid-passing openings. In this way, the hydraulic principle of flow of fluids passing through an orifice is combined with the hydraulic principle of flow of fluids moving through a slender tubular member in a simple, relatively inexpensive, hose design having a single cross-sectional profile throughout its entire length.

The hose of the instant invention is preferably of a thin water-impervious plastic material, such as polyethylene. The first fluid passage moves the water at a relatively high pressure along the full length of the hose for discharge into the intermediate passage through a series of spaced openings, apertures or orifices. The water then passes through openings associated with the intermediate passage into the outer passage for final discharge out of the hose itself through a number of openings or outlets in the outer passage. There is pressure decrease occurring as water passes through the first fluid-passing openings between the inner and intermediate chambers and within the outer chamber. That pressure decrease is such that the flow of water at the outlets is in the form of a drip under substantially quiescent conditions.

Advantages and objects of the present invention include the provision of a system which can be inexpensively produced, such being essential due to the vast quantities of hose needed to irrigate typical field crop installations which could involve thousands of acres. The system is compact, the hose capable of being flattened and rolled, thereby simplifying the handling, storage, shipping, installation and removal. The hose used is of a highly durable nature. In addition, large areas can be simultaneously watered without requiring excessive hiqh pressures or large volumes of water with the distribution of the water being uniform over extremely long lengths as well as on sloping layouts and in both surface and subsurface installations.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. a section taken along lines 8—8 of FIG. 6.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to FIGS. 1–5, reference 10 is used to generally designate the water distributing hose comprising the instant invention. The hose 10 basically comprises three tubular chambers. As oriented in FIG. 2, the water distributing hose 10 comprises a main first fluid passage or water-receiving chamber 12. Adjacent to this passage and sharing a common wall 18 is an intermediate chamber or second fluid passage 14. Adjacent to passage 14 and sharing a common wall 20, which, as shown, is essentially parallel to wall 18, is an outer low pressure chamber or third fluid passage 16. As can be seen, the three fluid passages are arranged one next to the other in a generally parallel relationship throughout the length of the hose.

In use, the first fluid chamber 12 is connected to a source of pressurized water. This can be effected, for example, by connecting the first fluid passage 12 at one end of hose 10 to a suitable fitting 21 in main 24. The other end 11 of the hose 10 is closed off to prevent escape of the water entering the hose. Such an arrangement has been generally illustrated in FIG. 1 wherein the hose 10 is illustrated next to rows of vegetables in a large field. It will be appreciated that such an arrangement is also equally adaptable for use in greenhouses and home gardens.

Figure 1:
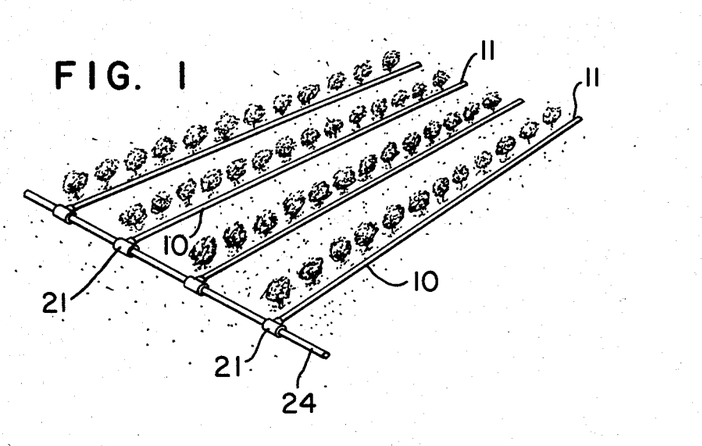
FIG. 1 is a pictorial view of a portion of a field employing a trickle irrigation system embodying the subject invention.
Figures 2, 3, 4:
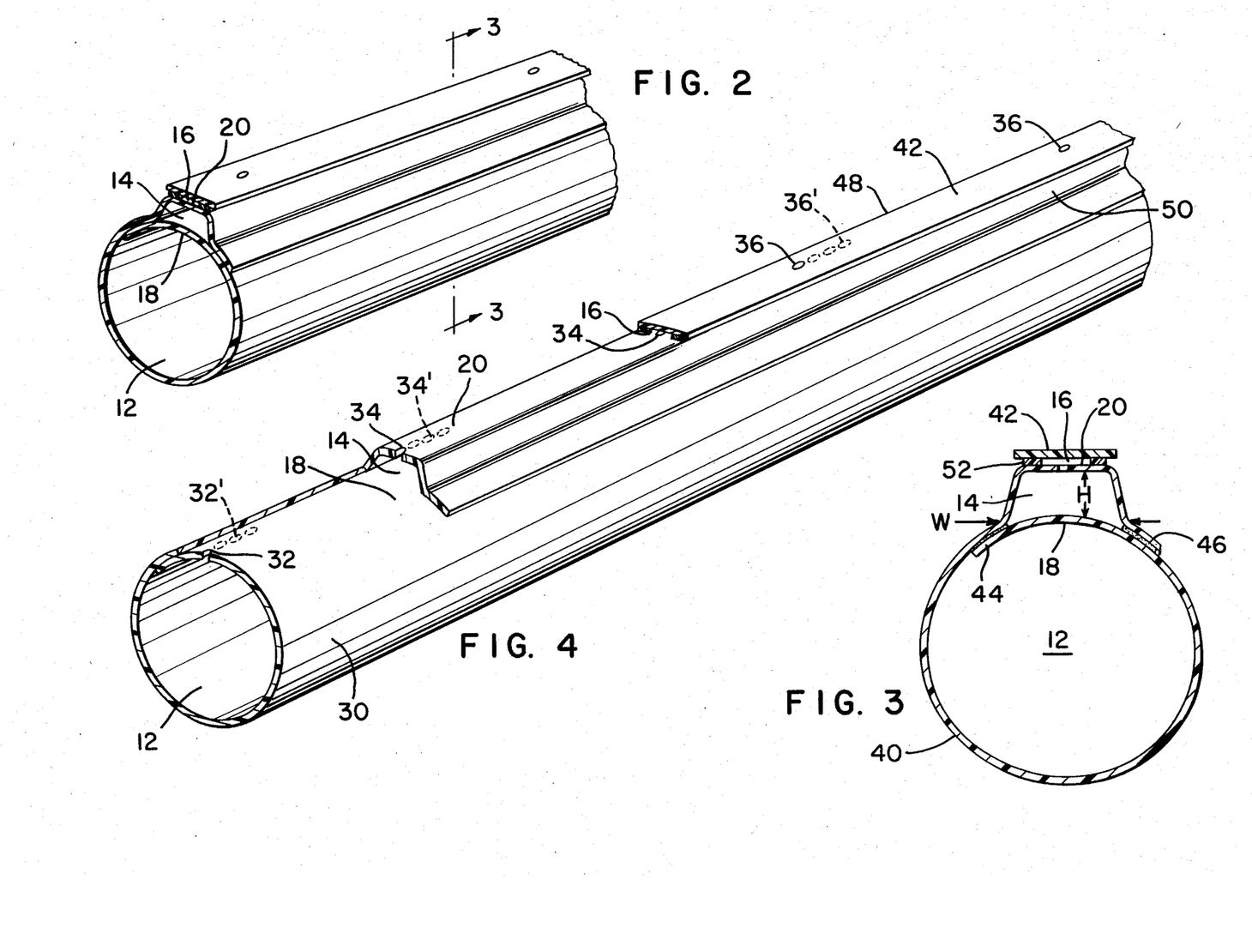
FIG. 2 is a perspective section of a portion of a hose incorporating the teachings of the subject invention.
FIG. 3 is a section taken along lines 3—3 of FIG. 2.
FIG. 4 is a perspective section, partially cut away of the hose of FIG. 2.

With reference to FIG. 4, which shows the various walls or layers partially cut away to reveal a fragmentary view of the different fluid passages constituting the hose, a wall 30, which defines the first fluid passage 12, is provided with a series of fluid-passing openings or orifices 32 therein, normally spaced a few inches to several feet apart throughout the full length of the hose. The orifices or first fluid-passing openings 32 are positioned so that they form a means of fluid communication between the first fluid passage 12 and the second fluid passage 14. As such, the first fluid-passing openings 32 are located somewhere within the common wall 18 defined between the first fluid passage 12 and the second fluid passage 14.

In like manner, the second fluid passage 14 contains a further set of fluid-passing openings or orifices 34 to form a means of fluid communication between the second fluid passage 14 and the third fluid passage 16. Thus, the second fluid-passing openings 34 are positioned somewhere along the common wall 20 defined between the second and third fluid passages 14 and 16. The second fluid-passing openings 34 generally have substantially lesser spacing between them than the spacing formed between the first fluid-passing openings 32. In actual practice, the spacing of the second fluid-passing openings 34 can vary from a few inches up to several feet.

The first and second fluid-passing openings 32 and 34 are preferably round and precisely formed by punching, lasers, or other suitable means to give uniform flow emission therethrough. The openings 32 and 34 are made in wall members 18 and 20, which are generally of uniform wall thickness in the immediate vicinity surrounding the openings. Therefore, the openings essentially function hydraulically as a true orifice, which has a theoretical emission rate, wherein doubling the pressure loss across the orifice increases the emission rate by 1.414 times.

Finally, the third fluid passage 16 contains a series of longitudinally spaced fluid-passing openings 36 to provide fluid communication between the third fluid passage and atmosphere. The sizes of the discharge fluid-passing openings 36 are such that they are essentially free flowing with substantially no flow resistance across the discharge openings. In addition, the openings 36 can be several times as large as the first and second fluid-passing openings.

In a preferred embodiment, the fluid-passing openings 32, 34 and 36 are defined in layers or walls that are essentially parallel with each other. Also, the openings are arranged in the layers so that the openings all lie in essentially a single plane that is substantially perpendicular to any of the layers. In terms of relative size, the first fluid-passing openings 32 as well as the second fluid-passing openings 34 are typically on the order of 0.015 to 0.025 inches in diameter, whereas the third fluid-passing openings 36 are typically on the order of 0.025 to 0.065 inches in diameter.

In a preferred embodiment of the hose, the first fluid passage 12 has a diameter of about 0.630 inches while the second fluid passage 14 has a generally trapezoidal cross section having a height H of about 0.085 and a width at the base of about 0.220 inches with the discharge fluid passage 16 having a generally rectangular cross section of about 0.014 (height)×0.080 (width) inches. At the same time, the first fluid-passing openings 32 are spaced approximately four feet apart, the second fluid-passing openings 34 are spaced eight inches apart and the outer openings 36 are spaced eight inches apart with each opening 36 being located intermediate between, but spaced from, a pair of openings 34. Finally, the inner and intermediate openings 32 and 34 have a diameter of about 0.021 inches whereas the outer openings 36 have a diameter of about 0.062 inches.

With the hose in this configuration, water is typically introduced into the first fluid passage 12 at about 6 psi. As the water from the first fluid passage 12 passes through the first fluid-passing opening 32 into the second fluid passage 14, there is a pressure drop of approximately 4.5 psi so that the pressure in the second fluid passage 14 is approximately 1.5 psi. In general, the pressure drop from the first fluid passage 12 to the intermediate passage 14 must be at least 25% of the pressure in the first fluid passage. As water from the second fluid passage 14 passes through the second fluid-passing openings 34, there is a further, but slight, pressure drop of approximately 0.13 psi so that the pressure within the third fluid passage 16 is approximately 1.37 psi at a point adjacent to the second fluid-passing openings 34. The flow rate for the preferred embodiment is about 0.5 gallons per minute per 100 feet of hose 10.

In constructing the hose 10, the second fluid passage 14 is of a relatively small cross-sectional area, as compared to that of the first fluid passage 12, so as to produce sufficient friction to the flow of water, whereby a major portion of the water flowing through each of the first fluid-passing openings 32 will tend to flow through the second fluid-passing openings 34 in the immediate vicinity of each particular first fluid-passing opening 32. This vicinity will normally consist of one-half the length of one second fluid passage section (hereafter defined). In this manner, there will be a minimum flow of water along the second fluid passage, thereby tending to cause a uniform flow or discharge of water through the openings 34 along the length of the hose 10. One second fluid passage section is defined as that length of hose between the midpoints of adjacent first fluid-passing openings 32. In other words, ideally, the second fluid passage geometry should be optimized to minimize the viscous friction pressure loss in any one second fluid passage section, and yet substantially eliminate fluid flow between any two adjacent second fluid passage sections, even should a static fluid pressure head exist between any two second fluid passage sections, such as caused by placement on a slope.

As the water passes laterally along the third fluid passage 16 from the second fluid-passing openings 34 to the adjacent discharge fluid-passing openings 36 on either side, there is a further pressure loss of approximately 1.37 psi due to friction created as water passes through the small third fluid passage 16 so that the pressure adjacent to the discharge fluid-passing openings is negligable (such as a 1" head of water or less). Therefore, the water actually drips out through the apertures 36 under substantially quiescent conditions under almost no outward pressure.

The pressure drop loss between an aperture 34 and its nearest outlet 36 within the fluid passage 16 depends on the width and height of the passage, the length of the passage between its inlet 34 and its outlet 36, and the rate of water passing through it.

An important function of the third fluid passage 16 is to increase the pressure within the second fluid passage. The cross section of the third fluid passage 16 is of a small enough size to frictionally restrict the flow, causing a pressure loss through said passage.

In the preferred embodiment, this pressure loss occurs within the third fluid passage 16 between each second fluid-passing opening 34 and the nearest discharge fluid-passing opening 36 on each side, the pressure loss being approximately 25% of the starting pressure in the first fluid passage 12, thereby creating a substantial back pressure to raise the pressure in the second fluid passage 14 to approximately 1.5 psi.

This substantial pressure in the second fluid passage 14 enables the hose to function properly even over sharp variations in the soil level, such as a mound. Since the preferred embodiment has approximately 1.5 psi at all second fluid-passing openings 34, which are only 4" from their adjacent discharge fluid-passing openings 36, the discharge fluid-passing openings 36 continue to flow substantially uniformly even over sharp changes in elevation, such as a mound of soil 20" high.

When field conditions are such that a greater height in mounds of soil are encountered, a hose with smaller cross section in the third fluid passage 16 can be used to frictionally create a higher back pressure against the second fluid passage 14, thereby providing the pressure needed in the second fluid passage 14 to give relatively uniform irrigation over mounds or sharp changes in elevation of 3 feet or more.

The higher 1.5 pound pressure in the second fluid passage also helps the flow uniformity when the field has a long but reatively uniform slope over the length of the hose.

In the present invention, the larger openings 36 do not substantially affect the flow rate. Water emerging from these openings actually drips out under virtually no pressure. This is to be contrasted against certain prior art hoses that use multiple fluid transmission chambers, such as described previously in connection with Chapin's U.S. Pat. No. Re. 28,095, where a particular ratio of the total area of the inner openings to the total area of the discharge openings is employed to control the flow, and flow is governed by the fluid passing through the various openings. In the present invention, however, because of the provision of the relatively small cross section of the third fluid passage 16, and the relatively large discharge fluid-passing openings 36, the flow comes out of the outlets in a drip rather than a small squirt as is often found in the prior art.

To achieve the no-squirt feature of this invention, the area of each discharge fluid-passing opening 36 should be large enough to allow its desired flow rate to pass through the opening without a substantial pressure loss across the opening. Generally, the maximum pressure loss across the discharge fluid-passing openings 36 without forming a squirt ranges from approximately 1.2" head of water for a 0.062" diameter opening to approximately a 4" head of water for a 0.018" diameter opening. In order for the fow from the discharge fluid-passing opening to emit as a drip, wherein the flow through the discharge fluid-passing opening essentially remains in contact with the exterior of the hose until it falls onto the soil adjacent to the discharge fluid-passing opening, the flow rates per opening should not exceed: 0.68 G.P.H. (gallons per hours) for a 0.062" diameter opening; 0.16 G.P.H. for a 0.025" diameter opening; and 0.12 G.P.H. for a 0.018" diameter opening. Thus, the parameters of hose design according to the present invention should preferably be selected to provide the desired flow rate through the discharge fluid-passing openings 36.

Discharge fluid-passing openings 36 of the same diameter as the first fluid-passing openings 32 and the second fluid-passing openings 34 can be used in the present invention. The combination can give the same advantages of higher pressure in the second fluid passage, but the flow is apt to pass through the discharge fluid-passing opening 36 as a squirt rather than a drip, especially in hoses that are designed for the higher flow rates and, as such, is not desirable.

As diagrammatically shown in FIG. 4, the first fluid-passing openings 32 are much more widely spaced apart than either the second or discharge fluid-passing openings 34 and 36. In fact, in a preferred embodiment, there are 6 times as many more second fluid-passing openings than there are first fluid-passing openings. As a practical matter, the ratio of the first to second fluid-passing openings can vary from a ratio of an equal number of first to second openings to one first to twelve or more second openings, depending on fluid-passing opening diameters. The spacing of the discharge openings can be any desired spacing according to soil and crop needs but preferably there are at least as many discharge openings as there are second openings.

The total area of the discharge fluid-passing openings is greater than the total area of the first fluid-passing openings by a ratio of at least 3:1 and the total area of the second fluid-passing openings is greater than the total area of the first fluid-passing openings by a ratio of at least 1.5:1.

Of additional significance is the placement of the various openings relative to each other. The first fluid-passing openings 32 are placed throughout the longitudinal length of the hose preferably along the center of the dividing wall 18 in a straight line parallel to the longitudinal axis formed by the first fluid passage 12. In turn, the second fluid-passing openings 34 are positioned one next to the other preferably along the center of the intermediate layer 20 along a line likewise parallel to the longitudinal axis of the first fluid passage 12. The openings 34, which in a preferred embodiment are about eight inches apart, are positioned askew relative to the openings 32 in order to prevent direct in line communication between these openings.

Finally, the openings 36 also are spaced eight inches apart and are positioned so that one opening 36 is intermediate relative to any adjacent openings 34. Thus, it can be seen that the spacing between the openings 34 and between the discharge openings 36 is the same. In this way, each opening 36 can be supplied by the intermediate opening 34 located on either side. If the portion of the third fluid passage on one side of a discharge opening should become clogged by excess foreign particles in the water, then that opening would still receive water from the third fluid passage portion on the other side.

In use, water, normally under a pressure of 6 psi is introduced into the water passage defined by the first fluid passage 12. Upon a filling of the inner water passage, the water, along the length of the first fluid passage 12, flows through the first fluid-passing openings 32 at approximately an equal rate along the length of the hose 10. The water then moves from each first fluid-passing opening 32 along the intermediate flow passage, defined by the second fluid passage 14. The water then moves through the second fluid-passing openings 34 within the outer fluid passage defined by the third fluid passage 16 to the outlets 36 as a slow drip discharge.

Figure 5:
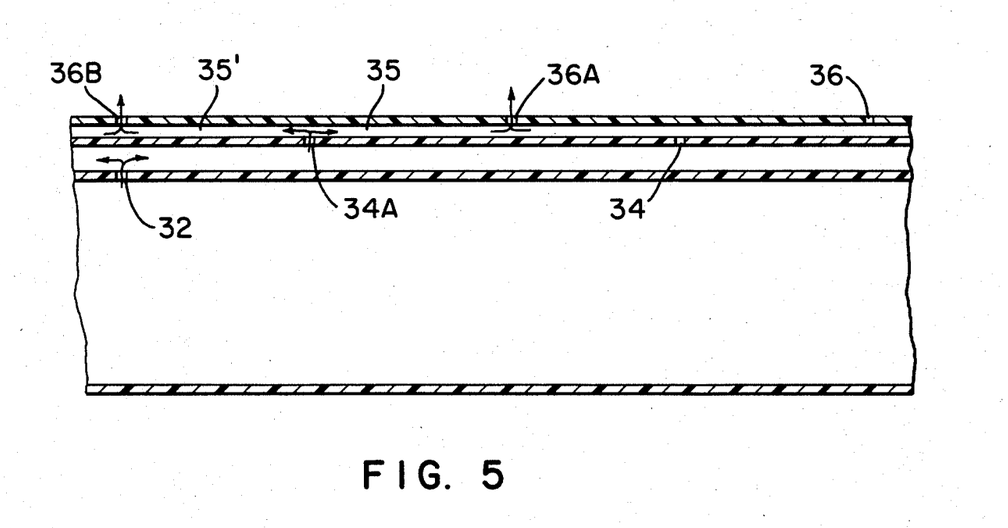
FIG. 5 is a longitudinal section of the hose of FIG. 2.

FIG. 5 illustrates the directions of flow through the various fluid-passing openings. The section 35 of the third fluid passage between the second fluid-passing opening 34A and the discharge fluid-passing opening 36A acts as a discharge fluid passageway, wherein the flow moves through the discharge passageway 16 from the second fluid-passing opening 34A toward the discharge fluid-passing opening 36A and, at the same time, the flow also moves through the discharge passageway 35' from the second fluid-passing opening 34A toward the discharge fluid-passing opening 36B.

From the accompanying drawings, it can be appreciated that the first fluid passage 12, formed by wall member 30, becomes circular when pressurized, forming a round tube essentially free of internal partitions or other obstructions that would provide additional surfaces in the flow channel causing more loss of pressure due to friction, as well as making the hose more difficult to collapse for storage and shipment.

As the hose is installed in the field, it is preferable to orient the hose so that the second and third fluid passages 14 and 16 are located on top of the first fluid passage 12 so that any foreign particles in the water would tend to settle to the bottom of the hose 12 rather than on the first fluid-passing openings 32.

While a 6 psi inlet water pressure is used to illustrate operation of the preferred embodiment, this invention will operate at inlet water pressures ranging from 2 psi to 60 or more psi, depending on the strength of wall 30, fluid-passing opening sizes, ratios, etc.

As can be seen with reference to FIG. 3, one method of producing the hose 10 involves provision of a single sheet or flat strip 40 which is joined back upon itself as at 44 and seamed by heat sealing to create the first fluid passage 12 with the remaining portion of the layer 40 being joined to itself as at point 46 also by heat sealing to create the second fluid passage 14. To complete the structure, a strip or layer of material 42 is laid across the outer surface of the second fluid passage 14 about the full length of the hose. As can be seen in FIGS. 3 and 4, the layer 42 has two longitudinal edges 48 and 50. Near the ends of each of the edges, the strip 42 is secured to the outer surface of the intermediate layer by heat sealing to form a pair of spaced, longitudinally-extending seams. In this way, the outer chamber 16 is formed. A convenient way of making said seals is to place two continuous narrow ribbons 52 and 54 of hot melted polyethylene parallel with each other between the layers 20 and 42, where the narrow ribbons also form the third fluid passage 16 into substantially a rectangular interior cross section. It is to be noted that all seals mentioned herein are continuous and without gaps through which water could transfer from one fluid passage to another or to atmosphere. All of the fluid-passing openings in this invention are preferably located in wall members rather than in the seams.

Of course, it is to be understood, variations of the present method as well as entirely different methods for producing the hose are contemplated. For example, any of the well-known methods for producing multichamber irrigation hoses by extrusion may be employed to produce the hose of the present invention.

When hoses run downhill, there is a tendency for a slight incremental pressure increase in the second fluid passage 14 along the decrease in elevation. The actual increase in psi might be the same from this cause (as with prior art hoses) but the percentage of increase would be less due to the higher established pressure in the second fluid passage. By way of example, a two channel hose, such as that disclosed in aforementioned U.S. Pat. No. Re. 28,095, operates with 0.5 psi as a typical outer chamber pressure. A 0.3 psi increase in the outer chamber due to decrease in elevation would be a 60% increase in psi due to slope. In the present invention, with a typical 1.5 psi in the second fluid passage, a 0.3 psi increase would amount to only a 20% increase in psi due to slope.

The flow emission of the hose of the present invention increases at a rate approximately 50% of any increase in the pressure at the inlet. This compares with prior hoses that rely upon the long path emitter principal (a small emitter channel which has flow restriction similar to a tube) which has flow rate change of approximately 100% of the pressure change. This means that a long length of hose produced in accordance with the present invention would have a flow at the closed end more nearly equal to the flow rate at the inlet end than would a hose of equivalent flow rate using the long flow path emitter principal entirely.

It is understood that a larger number of fluid-passing openings of a smaller size may be substituted for the first and second fluid-passing openings 32 and 34 (as shown in phantom in FIG. 1) as long as the total area of fluid-passing opening ratios (herein described) are maintained. An example would be substituting two or more first fluid-passing openings 32' of smaller diameter for each first fluid-passing opening 32 mentioned in the preferred embodiment, keeping the same total area of opening ratios. These substitute smaller fluid-passing openings 32' could be spaced at intervals with several close to each other, or spaced evenly throughout the length of wall member 18. These more numerous, but smaller, first fluid-passing openings provide an advantage under some water supply conditions by acting as a filter to prevent foreign particles from entering the second fluid passage 14. Such foreign particles would then be flushed by opening the normally closed-off end of the first fluid passage 12 and allowing water to run a few minutes.

Figure 6:
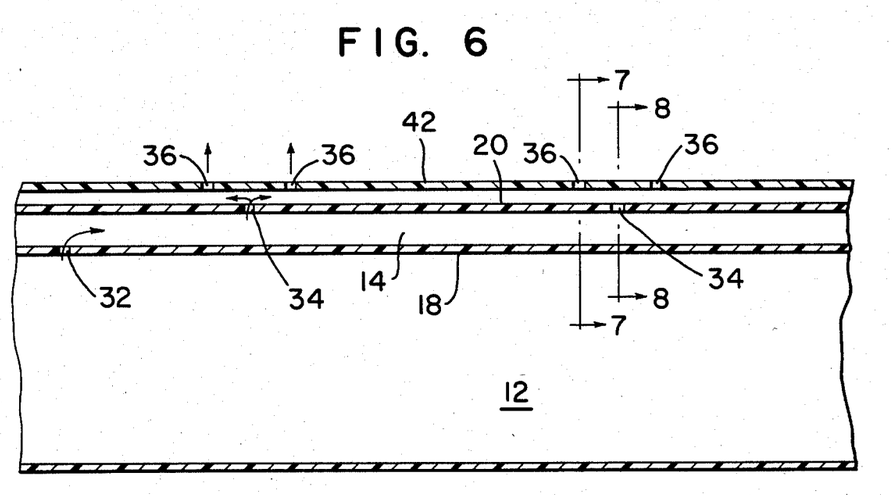
FIG. 6 is a longitudinal section of another embodiment of a hose for use in a trickle irrigation system.
Figure 7:
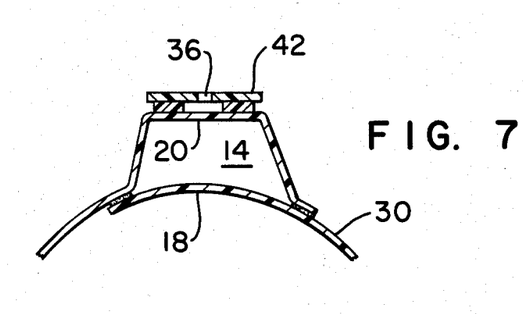
FIG. 7 is a section taken along lines 7—7 of FIG. 6.
Figure 8:
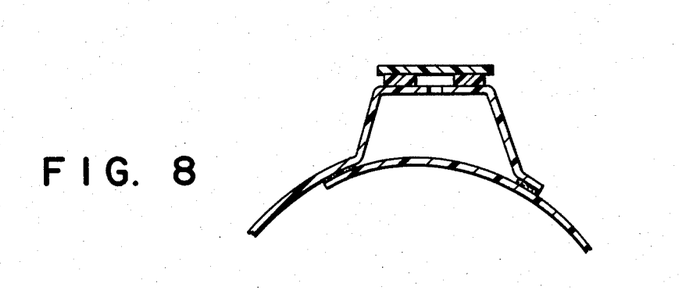

With reference to FIGS. 6 through 8, another embodiment is shown, where like reference numerals denote like elements, and only the differences will be described.

The basic difference between the first and second embodiments is in the arrangement of the discharge fluid-passing openings 36. In the second embodiment, as shown in FIG. 6, the discharge fluid-passing openings 36 are substantially larger than the second fluid-passing openings 34 and are located slightly offset, preferably closely positioned on either side approximately a half an inch from the second fluid-passing openings.

This other embodiment has the advantage of the no-squirt feature, due to the ratio of the total area of the discharge fluid-passing openings to the total area of the second fluid-passing openings being large enough so that the pressure is reduced within the third fluid passage 36 to within the range of approximately a 1" or less head of water in case of a 0.062" discharge fluid-passing opening, and approximately a 4" or less head of water if 0.018" discharge fluid-passing openings are used. However, this other embodiment does not substantially increase the pressure in the second fluid passage nor does it provide the advantage of the higher pressure second fluid passage herein referred to.

While descriptions herein have generally referred to water and fluid passages, it is understood the same hose can be used for chemical solutions such as insecticides, fungicides, fertilizers and also compressed air for soil aeration.

Since there is a wide variety of conditions encountered in the field, it is understood that the preferred embodiment is only one of many combinations of ratios and sizes of first fluid-passing openings, spacing of second fluid-passing openings, spacing of discharge fluid-passing openings, cross section of the third fluid passages, and pressures introduced into the first fluid passage, which fall within the scope and function of this invention.

For example, it is contemplated that two or more discharge fluid-passing openings (36' in phantom in FIG. 4), spaced close together, may be substituted for each discharge fluid-passing opening 36, their total area being sufficient to pass the desired flow without creating substantial pressure loss therethrough. Likewise, it is contemplated that one or more slits made close together longitudinally in the wall 42 may be made for each discharge fluid-passing opening 36. Such slits may be on a common line longitudinally of the hose or parallel side by side.

The foregoing is considered as illustrative only of the principals of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. For use in a fluid distributing system for plants and the like, an elongated fluid distribution hose, said hose comprising:
    first, second, and third fluid passages extending longitudinally thereof, said first fluid passage being adapted for communication with a source of pressurized fluid, said third fluid passage forming a continuous fluid path extending substantially the length of said hose;

a wall member separating said first and second fluid passage;

a second wall member separating said second and third passages;

first fluid-passing openings from said first fluid passage through said first wall member into said second fluid passage, said first openings providing fluid communication between said first and second fluid passages, each of said first fluid-passing openings being of predetermined size and spacing to create a first pressure drop between said first and second passages;

second fluid-passing openings from said second fluid passage through said second wall member into said third fluid passage, said second fluid-passing openings being of predetermined size and spacing for providing fluid communication between said second and third fluid passages, said first fluid-passing openings being more widely spaced than said second fluid-passing openings so that each first fluid-passing opening feeds a plurality of second fluid-passing openings;

discharge fluid-passing openings from said third fluid passage to the exterior of the hose wherein two adjacent said discharge fluid-passing openings are located substantially an equal distance from each said second fluid-passing opening;

said second fluid passage being of predetermined size to define water conveying means for conveying fluid from said first fluid-passing openings to said second fluid-passing openings with substantially no pressure loss taking place within said second fluid passage as fluid is conveyed from said first openings to their corresponding said second openings, and a plurality of elongated discharge fluid passageways defined by said third passage, each of said discharge passageways being defined between one of said second fluid-passing openings and its nearest discharge opening, each of said discharge passageways having a predetermined length and cross-sectional area for creating by friction between said fluid and the interior of said discharge passageways a second pressure loss between said second openings and said discharge openings so that a back pressure is created to raise the pressure in said second fluid passage to enable the hose to function properly over varying elevations of a terrain and so that said fluid exits said discharge openings under substantially quiescent conditions, said first and second pressure losses constituting a substantial portion of the pressure loss taking place between said first passage and said discharge fluid-passing openings.

2. The hose of claim 1, wherein the total cross sectional area of the second fluid-passing openings is greater than the total cross sectional area of the first fluid-passing openings by a ratio of at least 1.5 to 1.

3. The hose of claim 1, wherein the total cross sectional area of the discharge fluid-passing openings is reater than the total cross sectional area of the first fluid-passing openings by a ratio of at least 3 to 1.

4. The hose of claim 1, wherein said third fluid passage is generally of a rectangular cross section whose width is greater than its height by a ratio of at least 3 to 1.

5. The hose of claim 1, wherein the size of each discharge fluid-passing opening is such that it is essentially free flowing and imposes substantially no flow resistance.

6. The hose of claim 1, wherein the ratio of the diameter of each discharge fluid-passing opening to the flow rate therethrough is such that the flow upon passing through the discharge opening essentially remains in contact with the exterior of the hose until it falls onto the soil adjacent to the discharge opening.

7. The hose of claim 1, wherein the total cross sectional area of the first fluid-passing openings is such that there is a pressure loss across the first fluid-passing openings of at least 25% of the pressure in the first fluid passage.

8. The hose of claim 1 wherein the size of the cross section and length of the discharge fluid passageway provides a pressure loss of at least 1 psi between said second fluid-passing openings and their adjacent discharge fluid-passing openings.

9. The hose of claim 1, wherein the total area of the discharge fluid-passing openings is large enough so that the pressure loss across the discharge fluid-passing openings is a 1" or less head of water.

10. The hose of claim 1, wherein each discharge fluid-passing opening is located adjacent to a second fluid-passing opening by a space of one-half the distance to its adjacent discharge fluid-passing opening.

11. The hose of claim 1, wherein said wall member common to said first and second fluid passages is of relatively uniform thickness and has a width of at least 5 times the diameter of said first fluid-passing openings.

12. The hose of claim 1, wherein at least one of said second and third fluid passages forms a continuous fluid accommodating path extending substantially the length of said hose, said path being free of obstructions.

13. The hose of claim 1, wherein there are two or more discharge fluid-passing openings for each second fluid-passing opening.

14. The hose of claim 1, wherein each second fluid passage is of a size so as to produce minimal friction to fluid flow so that a major portion of the water flowing through each first fluid-passing opening will tend to flow out the second fluid-passing openings that is in the immediate vicinity of the first fluid-passing opening.

15. The hose of claim 1, wherein the total cross-sectional area of the second fluid-passing openings is greater than the total cross-sectional area of the first fluid-passing openings and the total cross-sectional area of the discharge fluid-passing openings is greater than the total cross-sectional area of the first fluid-passing openings.

16. The hose of claim 1, wherein two of said second fluid-passing openings pass fluid to a particular one of said discharge fluid-passing openings.

17. The hose of claim 1, wherein the first, second and third fluid passages are arranged next to each other in an axial direction away from the longitudinal axis of the hose in a generally parallel relationship throughout the length of the hose.

18. The hose of claim 17, wherein said first and second fluid-passing openings and said discharge fluid-passing openings all lie in essentially the same plane.

19. The hose of claim 1, wherein said hose is formed by joining a flat sheet of water impervious material back upon itself and sealing said sheet to create said first fluid passage of generally circular cross section when pressurized, and by joining a remaining portion of said flat sheet to itself to create said second fluid passage, and wherein said hose further comprises an elongated exterior wall layer secured to said sheet in the area of said second fluid passage for defining said third passage.

20. The hose of claim 1, wherein the flow through said discharge fluid passing openings increases at a rate of approximately 50% of the rate of any pressure increase in said first fluid passage caused by an increase in the pressure of the source of pressurized fluid.

21. For use in a fluid distributing system for plants and the like, an elongated fluid distributing hose, said hose comprising:

first, second and third generally hollow fluid passages extending longitudinally thereof, said first fluid passage being adapted for communication with a source of pressurized fluid, and said third fluid passage defining a continuous fluid accommodating path extending substantially the length of said hose, said path being free of obstructions, said third fluid passage being generally of a rectangular interior cross section;

a wall member separating said first and second fluid passages;

a second wall member separating said second and third fluid passages;

an exterior wall defining a portion of said third passage;

first fluid-passing openings from said first fluid passage through said first wall member into said second fluid passage each of said first fluid-passing openings being of predetermined size and spacing to create a first pressure drop between said first and second passages;

second fluid-passing openings from said second fluid passage through said second wall member into said third fluid passage, said first fluid-passing openings being more widely spaced than said second fluid-passing openings so that each first fluid-passing openings feeds a plurality of second fluid-passing openings;

said second fluid passage being of predetermined size to define water conveying means for conveying fluid from said first fluid-passing openings to said second fluid-passing openings, substantially no pressure loss taking place in said second fluid passage as fluid is conveyed from said first openings to said second openings;

discharge fluid-passing openings through said exterior wall of said third fluid passage to the exterior of the hose, each of said discharge fluid-passing openings being large enough so there is a very low pressure loss across it, and at least one of said discharge fluid-passing openings being closely positioned near a particular one of said second fluid-passing openings, so that substantially all of the fluid flowing through said particular opening passes through said at least one closely positioned discharge opening in the form of a drip under substantially quiescent conditions; and a plurality of elongated discharge fluid passageways defined by said third passage each of said discharge passageways being defined between one of said second fluid-passing openings and its nearest discharge opening, each of said discharge passageways having substantially the same predetermined length and cross-sectional area for creating a second pressure loss between said second openings and said discharge openings so that said fluid exits said discharge openings under substantially quiescent conditions, said first and second pressure losses constituting substantially all of the pressure loss taking place between said first passage and said discharge fluid-passing openings.

22. The hose of claim 21, wherein said discharge fluid-passing openings are located approximately one-half inch from said second fluid-passing openings.

23. The hose of claim 19, wherein the cross section of the third fluid passage is small enough to frictionally limit the flow within the third fluid passage so that most of the flow from each second fluid-passing opening emits from its closest discharge fluid-passing openings so that the flow from said second fluid-passing opening is deflected by said exterior wall and the flow from the discharge fluid-passing openings is in the form of a drip.

24. The hose of claim 23, wherein said discharge fluid-passing openings are arranged in pairs so that each opening of a particular pair is closely positioned near a particular one of said second fluid-passing openings, one discharge opening of said pair being located on either side of said particular opening so that the fluid flowing through said particular opening passes through both of said pair of discharge openings.

25. An elongated fluid distributing hose for irrigation of plants and the like planted on terrain of varying elevations, said hose comprising:

first, second and third fluid passages extending longitudinally thereof, said first fluid passage being adapted for communication with a source of pressurized fluid, said third fluid passage forming a continuous fluid path extending substantially the length of said hose;

a wall member separating said first and second fluid passages;

a second wall member separating said second and third fluid passages;

first fluid-passing openings from said first fluid passage through said first wall member into said second fluid passage, said first openings providing fluid communication between said first and second fluid passages, each of said first fluid-passing openings being of predetermined size to create a first pressure drop between said first and second passages;

second fluid-passing openings from said second fluid passage through said second wall member into said third fluid passage, said first fluid-passing openings being more widely spaced than said second fluid-passing openings so that each first fluid-passing opening feeds a plurality of second fluid-passing openings;

discharge fluid-passing openings from said third fluid passage to the exterior of the hose; and a plurality of adjacent discharge fluid passageways defined by said third passage, each of said discharge passageways being defined between one of said second fluid-passing openings and its neareat discharge opening, each of said discharge passageways being of predetermined length and cross-sectional area for creating a second pressure loss between said second openings and said discharge openings and for creating a back pressure to raise the pressure in said second fluid passage to enable the hose to function properly over varying elevations of a terrain, said first and second pressure losses constituting substantially all of the pressure loss taking place between said first passage and said discharge fluid-passing openings.

26. For use in a fluid distributing system for plants and the like, an elongated trickle irrigation hose, said hose comprising:

first, second and third elongated, generally hollow fluid passage extending longitudinally thereof, said first fluid passage being adapted for communication with a source of pressurized fluid, said third fluid passage forming a continuous fluid path extending substantially the length of said hose;

a first wall member separating said first and second fluid passages;

a second wall member separating said second and third fluid passages;

a series of first fluid-passing openings disposed in a spaced relationship generally longitudinally along said first wall member, each first opening providing fluid communication from said first fluid passage through said first wall member into said second fluid passage, each of said first openings being of predetermined size for creating a first pressure loss of predetermined magnitude between said first and second passages;

second fluid-passing openings from said second fluid passage through said second wall member into said third fluid passage, said second fluid-passing openings being of a predetermined size so that there is only a slight pressure loss across said second fluid-passing openings;

discharge fluid-passing openings from said third fluid passage to the exterior of the hose; and a plurality of discharge fluid passageways defined by said third passage, each of said passageways having a predetermined length and cross-sectional area for creating a second pressure loss between each of said second openings and its nearest discharge opening so that a back pressure is created to raise the pressure in said second fluid passage to enable the hose to function properly over varying elevations of a terrain, said first and second pressure losses together being of sufficient magnitude to cause said fluid to exit said discharge fluid-passing openings under substantially quiescent conditions, said first and second pressure losses constituting substantially all of the pressure loss taking place between said first passage and said discharge fluid-passing openings.

27. For use in a fluid distributing system for plants and the like, an elongated fluid distributing hose, said hose comprising:

first and second fluid passages extending longitudinally thereof, said first fluid passage being adapted for communication with a source of pressurized fluid;

a wall member separating said first and second fluid passages;

a second wall member defining a portion of said second passage;

first fluid-passing openings from said first fluid passage through said first wall member into said second fluid passage, each of said first fluid-passing openings being of predetermined size and spacing to create a substantial pressure drop between said first and second passages;

second fluid-passing openings from said second fluid passage through said second wall member, said first fluid-passing opanings being more widely spaced than said second fluid-passing openings so that each first fluid-passing opening feeds a plurality of second fluid-passing openings;

said second fluid passage being of predetermined size to define water conveying means for conveying fluid from said first fluid-passing openings to said second fluid-passing openings, substantially no pressure loss taking place in said second fluid passage as fluid is conveyed from said first openings to said second openings;

a third fluid passage extending from each second fluid passing opening to at least one discharge fluid passing opening in which the ratio of the area of said at least one discharge fluid passing opening to the area of its corresponding second fluid passing opening is large enough so that the flow is discharged to the exterior of the hose in the form of a drip, the outer perimeter of the cross-section of said third fluid passage being substantially smaller than the outer perimeter of the cross-section of said first fluid passage.

28. The hose of claim 27 in which said at least one discharge fluid passing opening is slightly offset and closely positioned to each said second fluid passing opening.

29. The hose of claim 27 in which said at least one discharge fluid passage opening consists of two discharge fluid passing openings, each being slightly offset from and closely positioned on either side of its corresponding said second fluid passing opening.

30. The hose of claim 29 in which each of said discharge fluid passing openings is positioned approximately $\frac{1}{2}$" from its corresponding said second fluid passing opening.

31. The hose of claim 27 in which said third fluid passage creates substantially no back pressure to raise the pressure in said second fluid passage.

32. The hose of claim 27 in which the third fluid passage extends longitudinally of the hose.

33. The hose of claim 27, in which said third fluid passage is formed in part by a pair of longitudinally extending side walls, each of said side walls joining said second common wall, said side walls spaced apart from each other to form the interior width of said third fluid passage in which the height of said side walls form the height of the cross-sectional profile of the third fluid passage.

34. The hose of claim 27 in which said second fluid passage forms a continuous fluid path extending substantially the length of said hose.

35. The hose of claim 27 in which an outer layer joins said pair of side walls forming said third fluid passage.

36. The hose of claim 27 in which each said second fluid passing opening comprises a plurality of closely spaced fluid passing openings.

37. For use in a fluid distributing system for plants and the like, an elongated fluid distribution hose, said hose comprising:

first, second and third fluid passages extending longitudinally thereof, said first fluid pasage being adapted for communication with a source of pressurized fluid;

a wall member separating said first and second fluid passage;

a second wall member separating said second and third passages;

first fluid-passing openings from said first fluid passage through said first wall member into said second fluid passage, said first openings providing fluid communication between said first and second fluid passages, each of said first fluid-passing openings being of predetermined size and spacing to create a first pressure drop between said first and second passages;

second fluid-passing openings from said second fluid passage through said second wall member into said third fluid passage, said second fluid-passing openings being of predetermined size and spacing for providing fluid communication between said second and third fluid passages, said first fluid-passing openings being more widely spaced than said second fluid-passing openings so that each first fluid-passing opening feeds a plurality of second fluid-passing openings;

said third fluid passage formed in part by a pair of longitudinally extending side walls, each of said side walls joining said second common wall, said side walls spaced apart from each other to form the interior width of said third fluid passage in which the height of said side walls forms the height of the cross-sectional profile of said third fluid passage;

discharge fluid-passing openings from said third fluid passage to the exterior of the hose;

said second fluid passage being of predetermined size to define water conveying means for conveying fluid from said first fluid-passing openings to said second fluid-passing openings with substantially no pressure loss taking place within said second fluid passage as fluid is conveyed from said first openings to their corresponding said second openings, and a plurality of elongated discharge fluid passageways defined by said third passage, each of said discharge passageways being defined between one of said second fluid-passing openings and its discharge opening, each of said discharge passageways having a predetermined length and cross-sectional area for creating by friction between said fluid and the interior of said discharge passageways a second pressure loss between said second openings and said discharge openings so that a back pressure is created to raise the pressure in said second fluid passage to enable the hose to function properly over varying elevations of a terrain and so that said fluid exits said discharge openings in the form of a drip under substantially quiescent conditions, said first and second pressure losses constituting the major portion of the pressure loss taking place between said first passage and said discharge fluid-passing openings.

38. The hose of claim 34 in which there is a pressure friction loss within the third fluid passage similar to the pressure friction loss created within a third fluid passage whose interior dimensions are 0.015"×0.080".

39. The hose of claim 34 in which the pair of said side walls are radially separated from each other by less than 45°.

40. The hose of claim 34 in which the hose has a single cross-sectional profile throughout its entire length.

41. The hose of claim 34 in which the cross-sectional profile of the second fluid passage is substantially smaller than the cross-sectional profile of the first fluid passage and the cross-sectional profile of the third fluid passage is substantially smaller than the cross-sectional profile of the second fluid passage.

42. The hose of claim 34 in which the cross-sectional area of the third fluid passage is less than 1% of the cross-sectional area of the first fluid passage.

* * * * *